Nov. 1, 1960 W. L. BENNINGHOFF ET AL 2,958,232
FEED AND RAPID RETURN DEVICE FOR MACHINE TOOLS
Filed Aug. 22, 1958 4 Sheets-Sheet 1

Nov. 1, 1960 W. L. BENNINGHOFF ET AL 2,958,232
FEED AND RAPID RETURN DEVICE FOR MACHINE TOOLS
Filed Aug. 22, 1958 4 Sheets-Sheet 2

Inventor
William L. Benninghoff &
Donald P. Geek,
By John H. Leonard,
Their Attorney.

Nov. 1, 1960  W. L. BENNINGHOFF ET AL  2,958,232
FEED AND RAPID RETURN DEVICE FOR MACHINE TOOLS
Filed Aug. 22, 1958  4 Sheets-Sheet 3
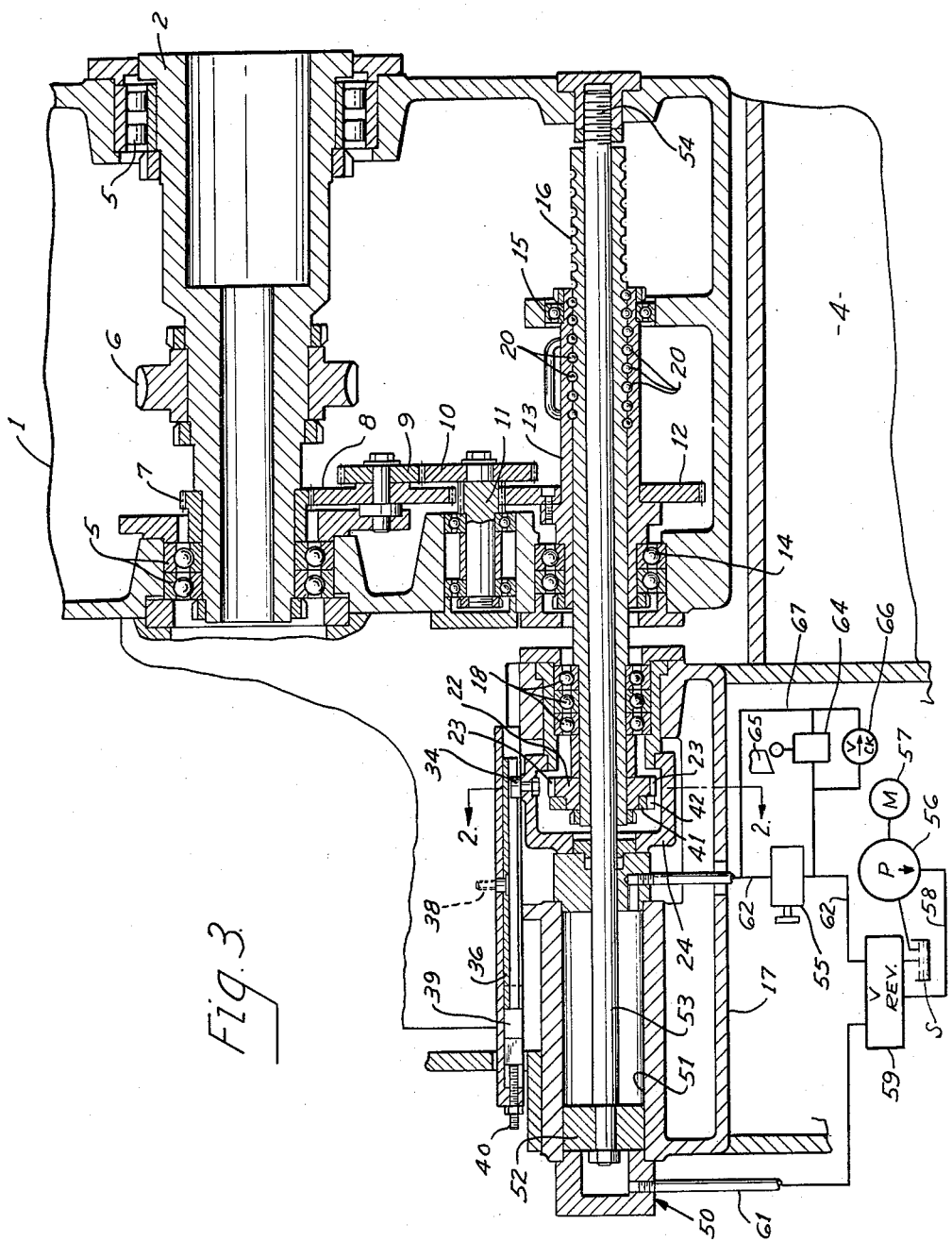
Inventor
William L. Benninghoff
Donald P. Beck,
By
John H. Howard,
their Attorney

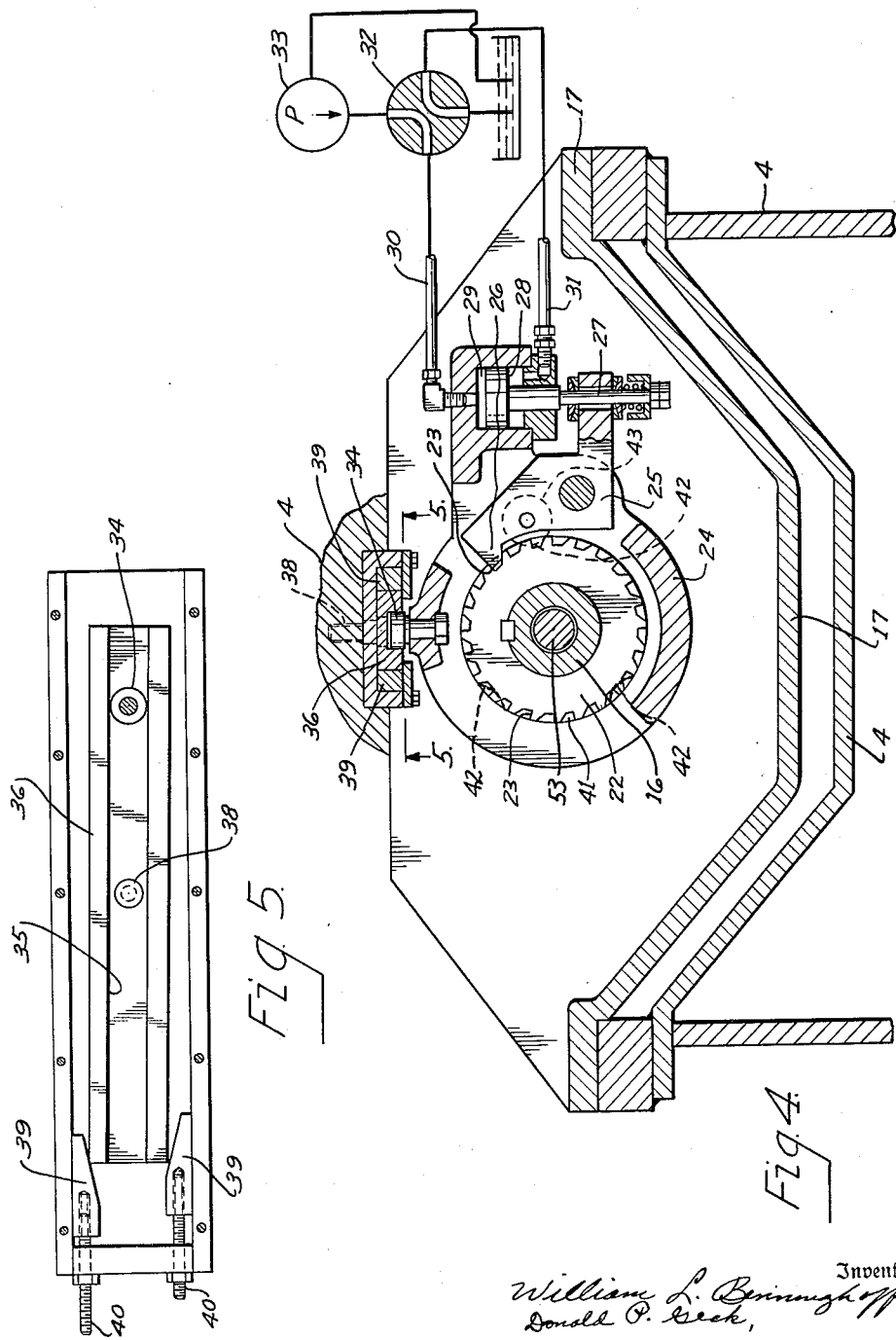

United States Patent Office 2,958,232
Patented Nov. 1, 1960

2,958,232

FEED AND RAPID RETURN DEVICE FOR MACHINE TOOLS

William L. Benninghoff, Willoughby, and Donald P. Geck, University Heights, Ohio, assignors to The Pipe Machinery Company, Wickliffe, Ohio, a corporation of Ohio Filed Aug. 22, 1958, Ser. No. 756,558

10 Claims. (Cl. 74—424.8)

This invention relates to a feed and return device for machine tools, and particularly to a feed and return device by which a spindle carriage or holding chuck of a machine tool can be advanced accurately at preselected uniform rates and can be returned extremely rapidly to starting position upon completion of the advance movement.

More particularly, the device is one by which the spindle carriage or work-holding chuck of a rotary spindle machine can be driven in the advance direction by means of an advancing force imposed by the relative rotation of a feed screw and nut, and in which, upon rapid traverse of the carriage or chuck in the advance direction, or return of the carriage or chuck toward starting position, by means other than the nut and screw, the screw can be rotated by the nut as a result of the retractive lineal force imposed axially on the nut by the carriage or chuck.

For illustration, the machine is shown as one in which the spindle carriage is advanced and retracted by a nut in the form of a sleeve which is rotatably driven in timed relation to the spindle and is drivingly connected by a follower to a coaxial screw. The screw is in fixed axial position relative to the machine frame and, during the driving relation of the sleeve nut and screw for advance of the carriage, is constrained from rotation about its axis relative to the carriage. However, the screw is releasable for free rotation about its axis relative to the carriage while the follower remains in driving engagement with the sleeve nut and screw so that the screw can be rotated by the axial non-rotative movement of the sleeve nut with the carriage due to movement of the carriage in the return direction or upon rapid advance of the carriage, by power means other than the screw and nut.

Various objects and advantages of the invention will become apparent from the following description, wherein reference is made to the drawings, in which:

Fig. 3 is an enlarged longitudinal sectional view of the machine, and is taken on line 3—3 in Figs. 1 and 2.

Fig. 4 is an enlarged fragmentary cross-sectional view of the machine and is taken on line 4—4 in Fig. 3;

Fig. 5 is a fragmentary top plan view of a portion of the machine, showing a pitch compensating means.

Figure 1:
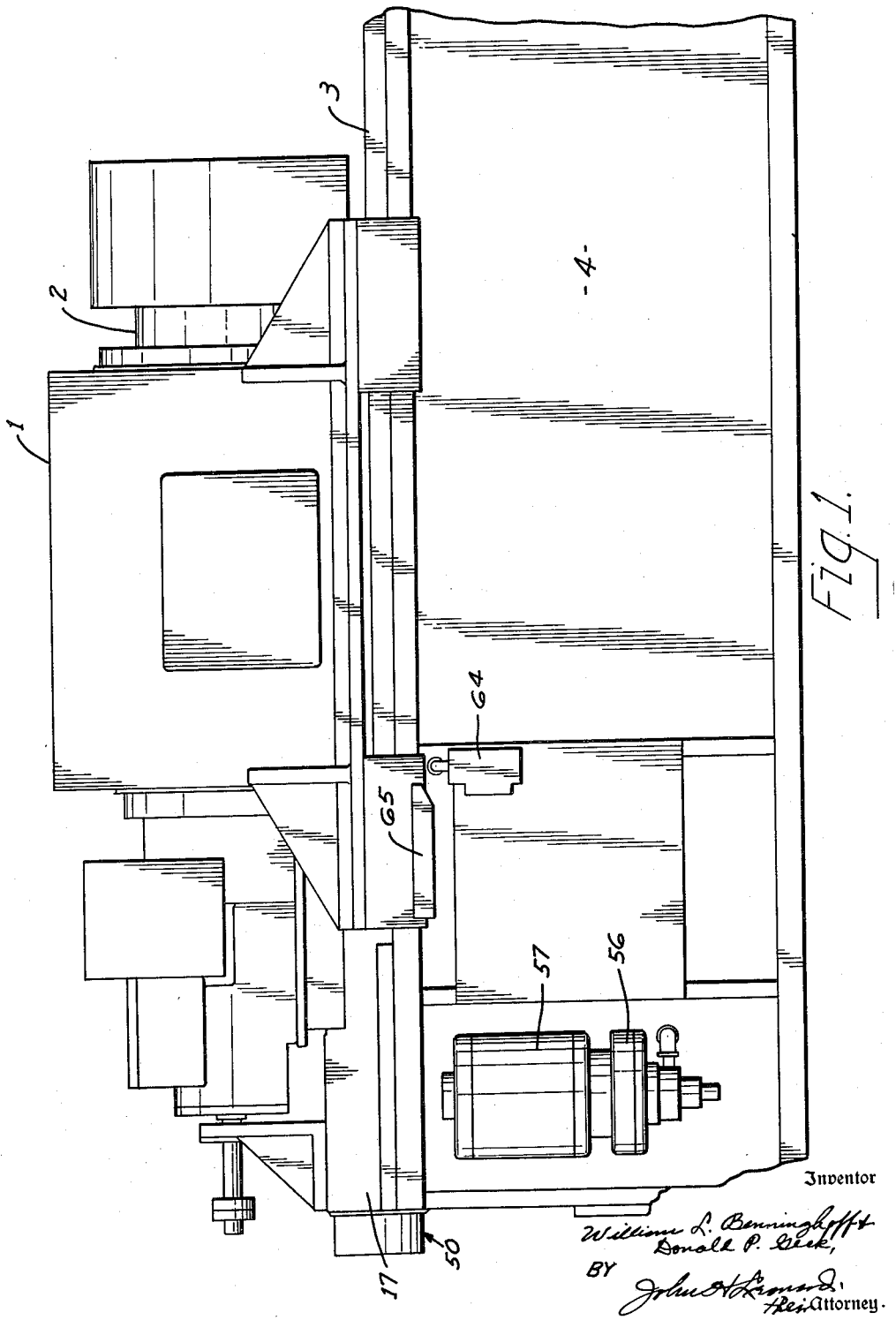
Fig. 1 is a side elevation of a machine embodying the principles of the present invention.
Figure 2:
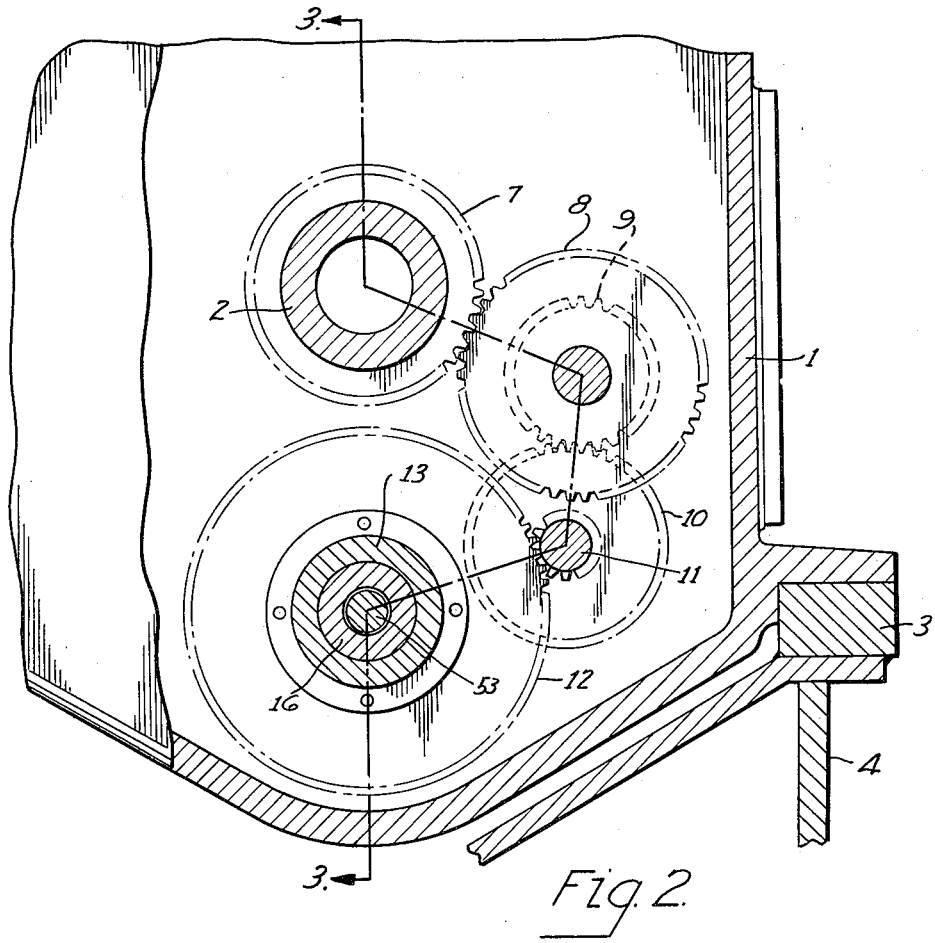
Fig. 2 is a fragmentary right end elevation of the machine illustrated in Fig. 1.

Referring to the drawings, the invention is shown as embodied in a rotary spindle thread cutting machine for threading pipes and the like, its application to other types of machine tools having carriages and chucks to be advanced and retracted relative to each other being readily apparent from the illustrative example.

In the form illustrated, the machine is one in which the chuck is stationary and the spindle carriage is advanced and retracted, the application of the invention to a machine in which the spindle carriage is stationary and the chuck is advanced and retracted being apparent from the illustrative example.

The machine includes a carriage 1 in which is rotatably mounted a power driven rotary spindle, indicated generally at 2, which is adapted to carry a tool or workpiece, as the case may be, and to cause an operation to be performed on a workpiece when the carriage is moved in the spindle advancing direction which, in Fig. 1, is to the right. The carriage 1 is mounted on slideways 3 on a main frame or bed 4 of the machine for lineal movement parallel to the axis of the spindle 2.

As best illustrated in Fig. 3, the spindle 2 is rotatably mounted in suitable bearings 5 in the carriage 1 for rotation about the horizontal axis and is driven by a suitable main driving gear 6 in any conventional manner desired, preferably by a suitable motor and gear transmission which may be mounted directly on the carriage 1, as more fully disclosed in U.S. Letters Patent No. 2,679,057, issued May 25, 1954, to Neil T. Sawdey.

Mounted on the spindle is a gear 7 which is part of a train of interchangeable speed reduction gears which are arranged to drive the carriage in the advance direction at different speeds relative to the rate of rotation of the spindle, depending upon the selection of the gears. In the form illustrated, the interchangeable gear train comprises a gear 8 which is driven by the gear 7 and which is connected in fixed circumferential position to a coaxial co-rotatable gear 9. The gear 9 drives a gear 10 which is connected in fixed circumferential position to a co-rotatable gear 11. The gear 11 is drivingly connected to a gear 12 which is mounted on, and co-rotatable with, a sleeve nut 13.

The sleeve nut 13 is rotatably supported in fixed axial position in the carriage 1 by means of suitable bearings 14 and 15 for rotation about an axis which preferably is parallel to the axis of the spindle 2.

A screw 16 is slidably received within the sleeve nut 13 in coaxial relation therewith and extends outwardly beyond the ends of the sleeve nut 13. One end of the screw 16 is disposed in a housing 17 which is fixedly mounted on the frame 4. The screws 16, at the portion within the housing 17, is supported for rotation about its axis and in fixed axial position relative to the housing 17 by suitable bearings 18.

Means, later to be described, are provided in the housing 17 for latching the screw 16 to prevent it from rotation relative to the carriage 1 and to release it for rotation relative to the carriage 1.

For drivingly connecting the screw and the sleeve nut, a follower, in the form of a plurality of recirculating balls 20, is provided. This form of nut, screw, and follower is available on the market and is known as a "recirculating ball screw." It has distinct advantages in that the frictional resistance to the rotation of the screw by axial movement of the sleeve nut, while the sleeve nut is non-rotating relative to the carriage 1, is so low that the screw can be caused to rotate by the sleeve nut if the screw otherwise is freely rotatable. This ability of the screw to be rotatably driven by the sleeve nut, when the sleeve nut is non-rotative, by axial forces applied to the sleeve nut, is present even when the screw has a relatively flat pitch, a pitch so flat that the ordinary screw and nut would be self-locking. With this arrangement, a screw with a pitch or helix angle of six degrees, or even less, can be rotated by such axial movement of the sleeve nut without danger of locking.

In order to drive the carriage 1 in the advance direction by means of the sleeve nut 13 and screw 16, the screw 16 is constrained from rotation relative to the carriage 1, while the sleeve nut 13 is rotated relative to the carriage 1, through speed reduction gears, by the spindle.

To return the carriage without having to drive the sleeve nut 13 by the change speed gears in a direction opposite that in which it was driven for advancing the carriage, the screw 16 is released from the housing 17 for free rotation about its axis. Upon movement of the sleeve nut 13 axially by the carriage 1 opposite from the advance direction, while the spindle is non-rotative, and the screw is released from the housing 17, and the sleeve nut 13 is prevented from rotation by the reduction gears, the screw 16 is driven rotatably by the balls 20. The same rotation of the screw by the sleeve nut and balls occurs when the carriage 1 is driven by any rapid traverse means in the advance direction so long as the screw is unlatched and free to rotate.

For latching the screw against rotation about its axis relative to the housing 17 and carriage 1 and for releasing it for rotation, selectively, the screw is provided, at the end which projects within the housing 17, with a suitable latch element 22. This element may be in the form of a disc which is secured in fixed position circumferentially on the screw 16 and which has a plurality of latch shoulders 23 which are spaced circumferentially from each other about the axis of the screw 16.

Rotatably mounted in fixed axial position in the housing 17 is a latching housing 24 which supports a latching mechanism which is cooperable with the shoulders 23. In the form illustrated, this mechanism comprises a rocker arm 25 on one end of which is a latching detent 26 which is arranged to engage a selected one of the shoulders 23 and arrest rotation of the screw 16 relative to the housing 24.

The opposite end of the rocket arm 25 is connected to a rod 27 of a piston 28 which is reciprocable in a cylinder 29. The cylinder 29 is in fixed position on the housing 24. The cylinder 29 is a double acting cylinder and is connected to a suitable source of fluid pressure through pipe lines 30 and 31 and a reversing valve 32. The source of fluid pressure may be a suitable pump 33, as shown.

The valve 32 is operable for connecting each end of the cylinder to the pressure side of the pump, selectively, and concurrently connecting the opposite end to the sump, so as to move the piston in each direction, selectively. For latching the screw 16 against rotation, the housing 24 could be mounted in fixed position circumferentially of the axis of the screw 16. However, it frequently happens that the mills require a slightly off-length thread for purposes of providing a preloaded screw thread connection in a pipe and the like. This may refuire a change in the ratio of advance of the spindle to rotation of the spindle to a ratio other than that which the screw pitch and speed reduction gearing can provide. Thus, for adding increments of pitch to that which the speed reduction gearing and the screw can provide, it is necessary to rotate the housing 17 slightly relative to the screw 16. Accordingly, the housing 24, though rotatably mounted in the housing 17, is constrained from rotation by a suitable cam follower 34 engaging a slideway 35 in a cam bar 36 which is mounted on the carriage 1. The slideway 35 is bias to the direction of travel of the carriage 1 and, therefore, it operates the follower 34 to rotate the housing 24 slightly and uniformly in opposite directions as the carriage 1 is advanced and retracted, respectively.

Since modification of the screw pitch is desired frequently, the cam bar 36 is mounted for rocking adjustment about a pivot 38. It is rocked about its pivot to different adjusted positions, and held in the adjusted position selected, by means of a pair of wedges 39 operated by cooperating adjusting screws 40. By changing the angularity of the bar 36 about the axis of the pivot 38, the desired increment of rotation of the housing 24 for predetermined rotation of the spindle 2 and screw 16 can be effected.

In order to select one or more of the shoulders 23 with which the detent 26 is to cooperate, so that the carriage 1 always starts from the preselected position, a suitable masking sleeve 41 is provided and is mounted on a hub on the latch element 22. The sleeve 41 is provided with one or more notches 42 and, by rotation relative to the disc 22, can be adjusted to locate the notches 42 at any position desired circumferentially of the disc 22.

The rocker arm 25 is provided with a hold-out member in the form of a roller 43 which is receivable in the notches 42, respectively, when aligned therewith. The sleeve 41 is of sufficient radial extent that, when the roller 43 is in engagement with its periphery, the sleeve maintains the detent 26 out of cooperating relation with any of the shoulders 23. On the other hand, when the roller 43 is aligned with, and drops into one of the notches 42, it allows the detent to engage a preselected one of the shoulders 23, thus indexing the starting positions of the spindle. As a result, after return of the carriage 1 and rotation of the housing 24 to starting position, the rotation of the screw 16 while the detent 26 is urged to latching position causes the detent to engage a preselected shoulder 23 each time.

During the feed of the carriage 1 by means of the screw 16 and sleeve nut 13, it is desirable that all slack be eliminated. This is accomplished by means of a piston and cylinder assemblage 50, comprising a cylinder 51 and a piston 52 reciprocable therein. The piston and cylinder assemblage preferably is coaxial with the screw and sleeve. The piston is provided with a rod 53 which extends axially through the screw 16 entirely past the forward end of the screw and, at its forward end, is connected to the housing 1 in fixed axial position relative thereto by suitable screw threads, as indicated at 54.

Pressure fluid normally is supplied to the cylinder at the rod side of the piston so as to yieldably urge the piston to the left in spindle carriage retracting direction. Thus, when the housing is driven to the right by the screw and sleeve, a pull is exerted on the piston rod by the carriage 1. This imposes a continuous reactionary thrust, due to the pressure fluid at the rod end of the piston, which yieldably urges the sleeve nut 13 axially in a direction opposite to the carriage advancing direction, and thus presses the balls 20 firmly against the forwardly facing sides of their grooves in the screw 16 and rearwardly facing sides of their grooves in the nut 13. This assures that the carriage 1 is fed in an advancing direction free of slack.

To control the amount of pressure resisting the movement of the carriage 1 in the advance direction and eliminating the slack in the carriage driving mechanism, a suitable adjustable relief valve 55 is connected to the cylinder 51 at the rod end of the piston 52.

Another function also is performed by means of the piston and cylinder assemblage 50 and that is for the rapid advance and return of the carriage 1. For return of the carriage 1, the head end of the cylinder is vented and pressure fluid is supplied to the rod end. Thus, with the detent 26 released so that the screw 16 is free to rotate, and with pressure applied to the rod end of the piston 52, the rod 53 pulls the carriage 1 in the return direction. Since the sleeve nut 13 is constrained from rotation by the frictional drag of the reduction gears and spindle 2, motion of the carriage and sleeve nut in the return direction causes a reaction on the balls 20 which, in turn, cause the screw 16 to spin about its axis. The same spinning action is true upon rapid advance of the carriage 1 effected by venting the rod end of the cylinder and applying the fluid pressure to the head end of the piston.

Figure 6:
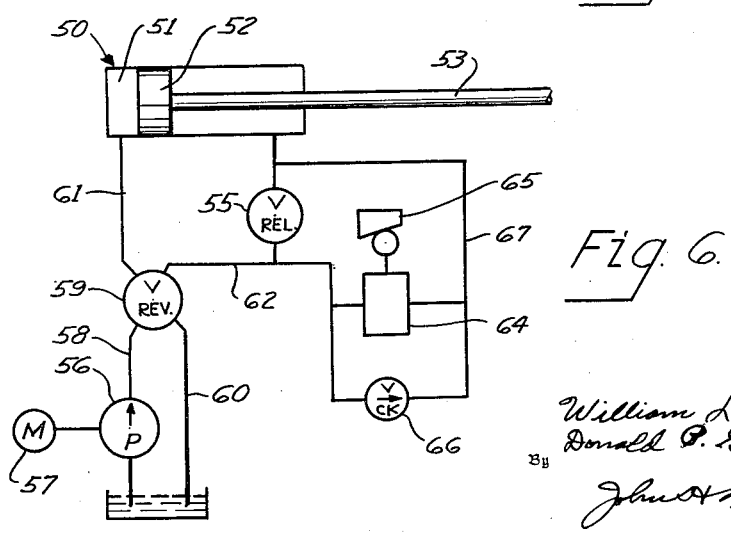
Fig. 6 is a hydraulic flow diagram showing the hydraulic system for control of the machine.

In order to effect these operations, the hydraulic circuit, such as illustrated in Fig. 6, is employed. In this circuit, pressure fluid is supplied from a suitable pump 56 driven by a motor 57 and connected to a sump S. A line 58 leads from the pressure side of the pump to a suitable reversing valve 59. A line 60 leads from the reversing valve back to the sump. The reversing valve is connected to the head end of the cylinder by means of a line 61 and to the rod end by means of a line 62. The reversing valve is such that pressure fluid can be supplied through the line 61 while the line 62 is connected to the sump, or the reverse. Connected in the line 62, between the rod end of the cylinder and the valve 59 is a cam operated, normally open, stop valve 64 which is operated by a cam 65 on the carriage 1. A check valve 66 is connected in parallel with the valve 64. One side of the valve 64 and of the check valve 66 are connected to the line 62 and the other sides of the valves 64 and 66 are connected by a line 67 to the rod end of the cylinder. The relief valve 55 is connected with the line 67 and the line 62 to provide a by-pass circuit thereacross, the relief valve being operable to discharge pressure fluid from the rod end of the cylinder against the setting of the valve but being inoperative to permit the flow of fluid in the opposite direction to the rod end.

In operation, with the reversing valve set in the position illustrated for a rapid advance of the carriage 1, fluid pressure is supplied to the head end of the piston 52, and since the rod end of the cylinder is vented through the normally open valve 64, the carriage is driven rapidly to the right or in advance direction. Upon continued movement of the carriage 1 to the right, the cam 65, which is carried thereon, closes the valve 64. Upon closure of the valve 64, flow of pressure fluid from the rod end of the cylinder therethrough is prevented and accordingly the venting from the rod end of the cylinder must be by way of the adjustable relief valve 55 which is set to maintain a predetermined pressure greater than line pressure. The check valve 66 is such that when the valve 64 is closed, fluid pressure cannot feed back around the valve 64 toward the valve 59. The valve 59 is one which in one position connects line 61 to the pump and 62 to the sump, in a second position connects 62 to the pump and 61 to the sump and in the return position both lines 61 and 62 to the sump. When valve 64 closes, the valve 59 is operated, by hand or a suitable limit switch, so as to connect both lines 61 and 62 to the sump.

Thereafter, the carriage is driven forwardly by means of the screw 16 and nut 13, and pressure is thereby developed at the rod end of the cylinder 51 and is maintained at a preselected value by the relief valve 55.

On the other hand, at the end of the advance movement, when it is desired to retract the carriage 1, the reversing valve is set in the opposite position in which the head end of the cylinder is vented to the sump and fluid pressure is supplied to the line 62. Thereupon, fluid pressure is supplied in by-passing relation to the relief valve 55 by way of the check valve 66, and the valve 64 if it is open, to the rod end of the cylinder, thereby retracting the cylinder and the carriage from the advanced position.

In operation, let it be assumed that the carriage 1 has been retracted to its starting position and that line pressure exists in the rod end of the piston and cylinder assemblage 50. Meanwhile, the spindle is being driven rotatably and, by means of the speed change gears, is driving the sleeve nut 13 rotatably and in a direction such that, were screw 16 constrained from rotation, it would drive the carriage 1 in the advance direction. At the same time, the shoulders 23 of the screw 16 are unengaged by the detent and the screw is rotating freely.

In order to start the threading operation, the valve 59 is operated to connect the head end of the cylinder 51 with the pressure source and connect the rod end with the sump by way of the valve 64 which is normally open. Thereupon, due to the effect of the pressure in the head end of the assemblage 50, the piston moves the carriage 1 in the advance direction. This operation continues until the cam 65 closes the valve 64. When the valve 64 is closed, since the valve 66 also closes in the direction of flow for venting the rod end, the pressure is equalized at both sides of the piston and cylinder assemblage and the carriage 1 stops. As the housing is moved at rapid traverse in the advance direction by means of the assemblage 50, the balls 20 rotatably drive the freely rotatable screw 16. When, at the end of this rapid traverse advance, the cam 65 closes the valve 64 and balances the pressure at opposite sides of the piston and cylinder assemblage, stopping the rapid traverse, fluid pressure is admitted to the cylinder 29 so as to operate it to cause the detent 26 to engage the selected shoulder 23 on the latch element 22 of the screw 16 and lock the screw against continued rotation. Thereupon, the drive is taken over by the sleeve 13 and its driving engagement with the now non-rotatable screw 16 through the balls 20. This drive is yieldably resisted by fluid pressure in the rod end of the cylinder 51 venting through the relief valve 55.

At the end of the forward advance movement, pressure fluid is admitted to the opposite side of the cylinder 29 so as to retract the detent 26 and permit the screw 16 to rotate freely again. While the detent 26 is in the retracted position, the valve 59 is thrown in the opposite direction so as to connect the pump to the rod end of the cylinder 51 and vent the head end of the cylinder 51 to the sump, thus retracting the carriage 1 to the starting position. During retraction, the sleeve nut 13 and balls 20 force the screw 16 to spin at a very high speed. Thus the rotatable sleeve nut 13 which drove the carriage 1 in the advance direction by rotating in one direction, does not have to rotate in the opposite direction upon return of the carriage to the starting position, as in a conventional screw and follower type in which the rotation of the screw or nut, whichever was rotated for advance, has to be rotated in a reverse direction for return of the carriage. Instead the sleeve nut 13 rotates the freely rotatable screw 16 which is disconnected drivingly from any other portion of the structure.

It is apparent, therefore, from the preceding description that means are provided for advancing the carriage 1 rapidly to the starting position, for feeding under preload during the work cycle, and for returning to starting position more accurately and simply than with the conventional nut and screw feed.

Having thus described our invention, we claim;

1. In a machine tool including a frame, a carriage mounted for reciprocation on the frame, a sleeve nut rotatably mounted in fixed axial position on the carriage, rotary power driven means on the carriage and drivingly connected to the sleeve nut for rotating the sleeve nut, a screw rotatably mounted in fixed axial position on the frame and slidably received in coaxial relation in the sleeve nut, follower means drivingly interconnecting the sleeve nut and screw for driving the sleeve nut by the screw axially in one direction upon rotation of the sleeve nut relative to the screw and carriage by the rotary power driven means while the screw is restrained from rotation relative to the frame and carriage, and for rotatably driving the screw by the sleeve nut upon movement of the sleeve nut axially while the screw is released for free rotation relative to the frame and carriage, latch means engageable with the screw, and operable to restrain the screw from rotation and to release the screw for rotation, selectively, and traversing power means drivingly connected to the carriage for driving the carriage independently of the sleeve nut while the screw is free for rotation.

2. The structure according to claim 1 wherein the traversing power means includes a reversible piston and cylinder assemblage connected to the carriage, and means provide fluid pressure whereby the assemblage yieldably resists movement of the carriage in a direction in which it is driven by the sleeve nut.

3. The structure according to claim 2 wherein control means are provided for supplying fluid pressure to one end of the assemblage so as to drive the carriage in one direction, and to discontinue supplying the last mentioned fluid pressure to said one end of the assemblage when the carriage has reached a predetermined position by movement in said one direction.

4. The structure according to claim 1 wherein said screw is hollow, a rod extends axially through the screw and is connected at one end to the carriage and at the other end to a piston, and a cylinder is mounted on the frame and accommodates the piston.

5. The structure according to claim 1 wherein the follower means are balls and the sleeve nut has a passage by which the balls can recirculate into and out of driving engagement between the sleeve nut and screw.

6. The structure according to claim 1 wherein the rotary power driven means is a spindle and is drivingly connected to the sleeve nut by speed reduction gears.

7. The structure according to claim 1 wherein the cooperable latch means includes means on the screw having a plurality of locking shoulders spaced apart in fixed position circumferentially of the screw, a latch housing carried by the frame, a detent mounted in the housing for movement into and out of latching relation to said shoulders, selectively, and means to move the detent.

8. The structure according to claim 7 wherein means support the housing on the frame for rotation about the screw axis, lead modifying means are provided which are movable with the carriage, cooperable lead modifying means are connected to the housing for rotating the housing in a predetermined relation to movement of the carriage in its opposite directions of reciprocation.

9. In a machine tool including a frame, a carriage mounted on the frame for guided lineal movement in opposite directions, a rotatable power-driven spindle mounted in the carriage with its axis parallel to the direction of travel of the carriage, a sleeve nut mounted in fixed axial position in the carriage for rotation about an axis parallel to the spindle axis, a screw rotatably mounted in fixed axial position on the frame and coaxial with, extending through, and slidable axially relative to, the sleeve nut, speed reduction means rotatably drivingly connecting the spindle and sleeve nut in predetermined rotary speed relations to each other, cooperable latch means carried by the frame and screw and operable for latching the screw against rotation relative to the carriage and for releasing the screw for rotation relative to the carriage, selectively, recirculating ball follower means operatively connecting the sleeve nut and screw to drive the sleeve nut in the spindle advancing direction when the sleeve nut is rotated by the speed reduction means relative to the screw as the screw is restrained from rotation relative to the carriage, and to rotate the screw when the sleeve nut is moved in the spindle retracting direction while the screw is released for free rotation relative to the carriage, and traversing power means drivingly connected to the carriage for driving the carriage lineally.

10. An index device for indexing the starting position of a screw driven reciprocable carriage of a machine tool and comprising a latch element rotatably driven by the screw in predetermined relation to rotation of the screw and having a plurality of latching shoulders arranged in a row about the axis of rotation of the element, a detent engageable with the shoulders, selectively, a masking sleeve rotatable with the element and adjustable circumferentially relative thereto, a hold-out member operatively connected with the detent for constraining the detent from engaging the shoulders while the hold-out member is in engagement with a predetermined surface of the masking sleeve, and said sleeve having at least one interruption in said surface which, when aligned with the hold-out member, releases the hold-out member and thereby permits the detent to engage a preselected one of the shoulders.

References Cited in the file of this patent
UNITED STATES PATENTS

| | | |
|---|---|---|
| 1,367,459 | Carson | Feb. 1, 1921 |
| 1,740,744 | Parsons | Dec. 24, 1929 |
| 2,235,085 | Roehm et al. | Mar. 18, 1941 |
| 2,239,625 | Roehm et al. | Apr. 22, 1941 |
| 2,309,673 | Fickett et al. | Feb. 2, 1943 |
| 2,367,492 | Fickett et al. | Jan. 16, 1945 |
| 2,508,281 | Miller et al. | May 16, 1950 |